Nov. 13, 1951  E. UTTERBACK ET AL  2,574,850
METHOD AND APPARATUS FOR HYDROCARBON CONVERSION
Filed Jan. 2, 1947  2 SHEETS—SHEET 1

Fig. 1.

INVENTORS
ERNEST UTTERBACK
FRANK C. FAHNESTOCK
BY John A. Crowley, Jr.
AGENT OR ATTORNEY Nov. 13, 1951  E. UTTERBACK ET AL  2,574,850
METHOD AND APPARATUS FOR HYDROCARBON CONVERSION
Filed Jan. 2, 1947  2 SHEETS—SHEET 2

INVENTORS
ERNEST UTTERBACK
FRANK C. FAHNESTOCK
BY
AGENT OR ATTORNEY

Patented Nov. 13, 1951

2,574,850

UNITED STATES PATENT OFFICE 2,574,850

METHOD AND APPARATUS FOR HYDROCARBON CONVERSION

Ernest Utterback, New York, and Frank C. Fahnestock, Manhasset, N. Y., assignors to Socony-Vacuum Oil Company, Incorporated, a corporation of New York Application January 2, 1947, Serial No. 719,724

26 Claims. (Cl. 196—52)

1

This invention has to do with a method and apparatus for conversion of high boiling liquid hydrocarbons or mixed phase hydrocarbons to lower boiling hydrocarbons in the presence of a moving particle-form contact mass material which may or may not exhibit catalytic properties with respect to the conversion reaction. Typical of such processes is the catalytic conversion of heated liquid hydrocarbons to lower boiling gasoline containing gaseous products by the contacting of a high boiling liquid charge at temperatures of the order of 850° F. and upwards with a particle-form adsorbent catalytic material. Other exemplary processes are the thermal visbreaking, coking or cracking of liquid or mixed phase hydrocarbon charge by contact with heated particle-form inert contact materials.

In such processes wherein the contact material is catalytic in nature it may partake of the nature of natural or treated clays, bauxite, activated alumina or synthetic associations of silica, alumina or silica and alumina to which other substances such as certain metallic oxides may be added in small amounts for specific purposes. When the contact material is inert in character it may partake of the form of refractory materials such as zirkite, corhart material, or mullite or it may partake of the form of stones or metallic particles or balls.

This invention is specifically directed to certain method and apparatus improvements in a hydrocarbon conversion system wherein the contact material passes cyclically through a conversion zone wherein it is contacted at suitable conversion temperatures with a liquid or mixed phase high boiling liquid hydrocarbon charge to effect conversion thereof and then through a regeneration or reconditioning zone wherein it is contacted at elevated temperatures with a suitable gas for conditioning said contact material to a condition suitable for reuse in said conversion zone.

A type of conversion system which has met with wide commercial success because of its practical advantages is one where in the contact material moves as a substantially compact column within the conversion zone. In such systems it has been customary to supply the contact material into the conversion chamber through one or more tubes extending downwardly through a short upper section of said chamber and terminating at the surface of the column of contact material within said chamber. When a liquid or mixed phase hydrocarbon charge is to be con-

2 verted it is desirable to supply all or a large part of the heat required for conversion in the incoming contact material. This means that the incoming contact material and the tubes through which it enters and other metal surfaces in the upper section of the conversion vessel exist at temperatures sufficiently high to cause, upon contact by the liquid hydrocarbon charge, rapid conversion of said charge. As a result, there is a marked tendency for coke to form on the hot tubes and metal surfaces in the upper section of the conversion vessel. This coke eventually breaks off from the metal surfaces in large chunks which pass downwardly through the converter and plug up restricted passages for solid flow near the lower end of the converter and in other portions of the cyclic system. Another problem that may arise when an attempt is made to convert liquid hydrocarbons in the presence of a contact material is that of uniformly distributing the liquid hydrocarbon charge on the contact material in all portions of the vessel cross-sectional area and the prevention of liquid and vapor channeling through certain portions of the contact material column.

A major object of this invention is the provision in a system for conversion of liquid or mixed phase hydrocarbons in the presence of a particle-form contact material of an improved method and apparatus for hydrocarbon and contact material introduction to the conversion zone which avoids the difficulties hereinabove described.

A specific object is the provision in a continuous cyclic process for conversion of high boiling liquid and mixed phase hydrocarbon charges to lower boiling gaseous hydrocarbon products of a method and apparatus permitting uniform distribution of the hydrocarbon charge over the surface of the contact material in the conversion zone without excessive accumulation of coky deposits upon the metal surfaces within said zone.

These and other objects of this invention will become apparent from the following description of the drawings of which

Figure 1:
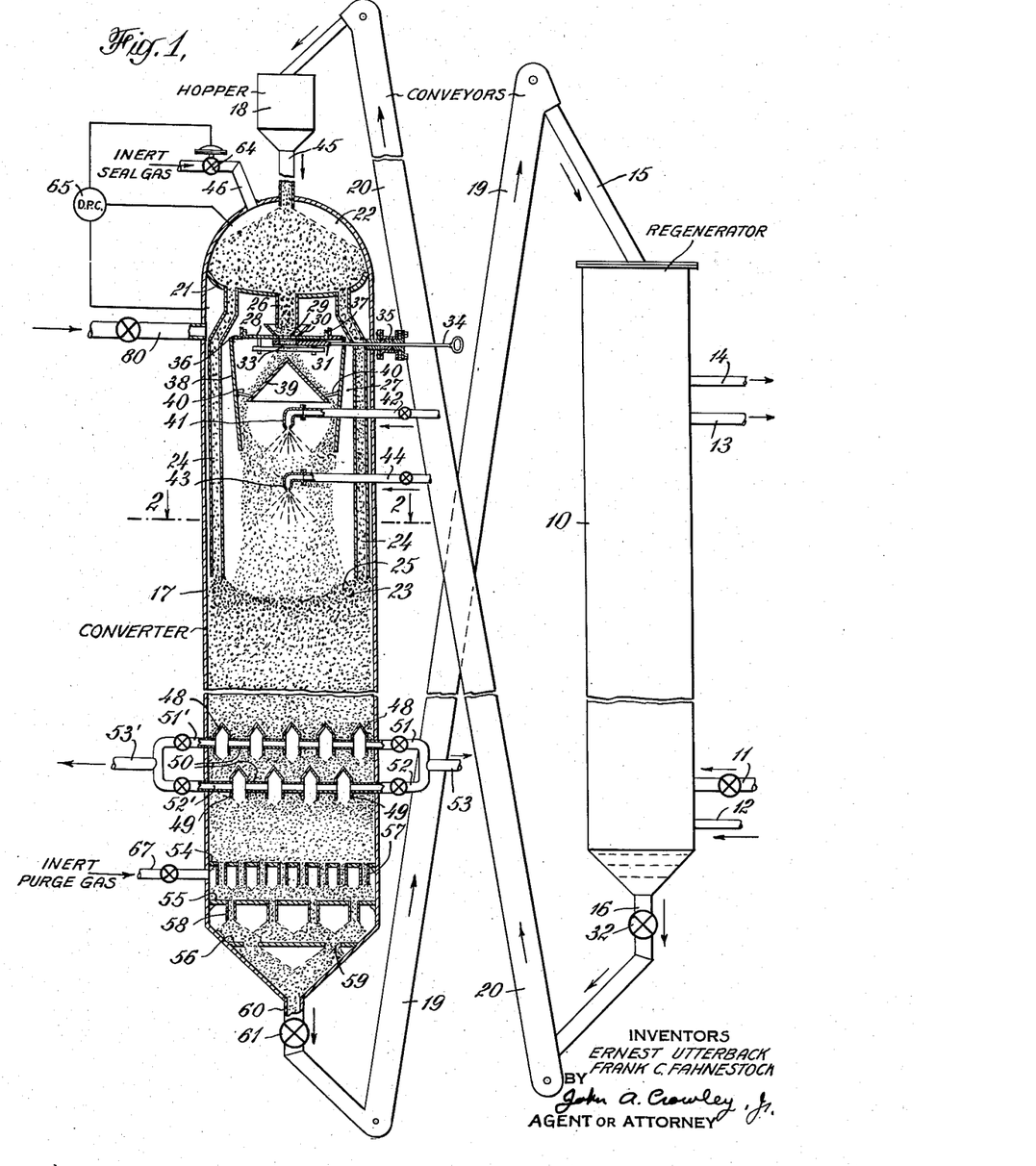
Figure 1 is an elevational view, partially in section, showing a preferred form of the invention.
Figure 2:
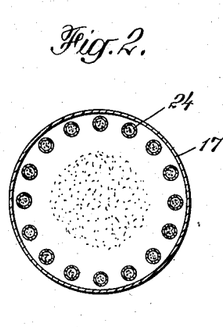
Figure 2 is a sectional view taken along line 2—2 of Figure 1.

Turning now to Figure 1, we find a diagrammatic flow sketch of a continuous hydrocarbon conversion process. In Figure 1, there is shown a regeneration vessel 10, provided with combustion supporting gas inlet 11 and heat exchange fluid inlet 12 near its lower end and flue gas outlet 13 and heat exchange fluid outlet 14 near its upper end. The heat exchange fluid inlet and outlet connect into heat transfer tubes (not shown) distributed within the regenerator. Also provided is a solid material inlet 15 at the top of the regenerator and a solid material outlet 16 at the lower end thereof bearing a flow control valve 32. It will be understood that regenerators of other construction may be substituted for that shown within the scope of this invention as long as such modified constructions permit combustion regeneration of moving particles of spent contact mass materials at controlled elevated temperatures. In systems wherein the contact material is an inert material, the vessel 10 may take the form of a reconditioning apparatus in whatever form may be required for conditioning the contact material for reuse in the conversion zone. Also shown in Figure 1 is a converter 17, a supply hopper 18 located thereabove and conveyors 19 and 20 adapted to transfer hot contact material particles between the regenerator and converter vessels. The conveyors may take the form of continuous bucket elevators for example. Extending across the upper section of vessel 17 is a partition 21 which serves to provide a seal chamber 22 in the upper end of vessel 17 and a conversion chamber 23 therebelow. A plurality of spaced conduits 24, which may be arranged on a circular pattern as shown in Figure 2, depend from partition 21 to a level therebelow in the conversion chamber 23. It will be noted that the conduits 24 serve as passages for solid flow from seal chamber 22 to the surface 25 of the contact material column within the conversion chamber and that the conduits extend only through that portion of the horizontal cross-sectional area of the upper portion of the chamber which is near the outer periphery of said chamber. Another conduit 26 extends downwardly from a central portion of partition 21 to a level in the upper section of gas space 27 in the conversion chamber. A flow throttling device is provided below the lower end of the conduit 26. The flow throttling device broadly consists of a plate 28 having a hole 29 therein and a receiving funnel 30 positioned around the hole and a slide plate 31 therebelow which may be adjusted so that a hole 33 therein coincides partially or entirely with the hole 29 in plate 28 or so as to entirely block the flow through hole 29. A rod 34 is connected to the slide plate 31 and passes through stuffing box 35 on the vessel shell to permit adjustment of the throttling device from a point outside the vessel 17. The throttling device is supported by means of angle irons 36 and 37 which extend across the chamber in a direction perpendicular to the face of the drawing. Also supported by the angle irons 36 and 37 is a skirt 38 which is open on either end and positioned centrally with its axis vertical within the vessel 17. The skirt 38 tapers inwardly slightly so as to direct solid flow toward the center of the chamber. A conical shaped baffle 39 is supported by rods 40 substantially centrally within the skirt 38 and below the flow throttling device. The diameter of the base of the baffle 39 is less than that of the skirt 38 so as to provide an annular space for solid flow therebetween. A liquid spray device 41 is positioned substantially centrally of the vessel cross-sectional area adjacent the lower end of skirt 38. Liquid or mixed phase hydrocarbon charge may be supplied to the spray device 41 through pipe 42. A similar spray 43 and feed pipe 44 may be provided at a lower level in gas space 27. A contact material gravity feed leg 45 extends between hopper 18 and seal chamber 22 and a conduit 46 connects into seal chamber 22 for introduction of an inert gas thereinto. In the lower section of the vessel 17 there are provided two vertically spaced rows of spaced gable-roofed gas collecting troughs 48 and 49. Adjacent troughs are connected by means of nipples 50, and feed pipes 51 and 52 and 51' and 52' connect into the end troughs in rows 48 and 49, respectively. The pipes 51 and 52 and 51' and 52' are in turn manifolded into outlet pipes 53 and 53' respectively on opposite sides of the vessel. Below the levels of the collector troughs are provided three spaced partitions 54, 55 and 56. A plurality of uniformly distributed circular rows of nipples 57 depend from the uppermost partition 54 and a lesser number of rows of nipples 58 depend from the next lower partition 55. The nipples 58 are horizontally staggered proportionately between the nipples 57 thereabove. A circular row of holes 59 are provided in the lowermost partition 56, the row of holes being horizontally staggered with respect to the two rows of nipples 58 thereabove. An outlet conduit 60 bearing flow control valve 61 is provided on the lower end of the vessel 17.

In operation, contact material particles are supplied from hopper 18 through leg 45 into the seal chamber 22. The contact material passes from the seal chamber 22, through conduits 24, directly onto the surface of the column of contact material within the conversion chamber 23. The temperature of the contact material so supplied to the conversion chamber should be suitable for supporting the intended hydrocarbon conversion. Liquid or mixed phase hydrocarbon charge is sprayed into the gas space 27 from spray devices 41 and/or 43. The spray of liquid hydrocarbons is limited to the central portion of the vessel cross-sectional area. On the other hand, the conduits 24 through which the hot contact material charge enters are positioned only along the outer periphery of the chamber instead of being uniformly spaced throughout the cross-sectional area of the chamber. In this manner, contact between liquid charge and hot metal surfaces in the gas space 27 is limited so as to avoid the tendency for coke formation on such surfaces. It has been found that the tendency for such coke formation may be still further avoided and the distribution of the liquid charge on the contact material may be greatly improved by also introducing contact material into the upper section of gas space 27 through conduit 26 at a rate controlled by the slide valve therebelow. The contact material passing from the conduit 26 which is horizontally centrally positioned falls onto the conical shaped baffle 39 and falls therefrom between the annular space between baffle 39 and skirt 38 as a shower of freely falling particles, which shower is restricted by means of the baffling substantially to only a central portion of the gas space 27 until the particles reach the surface 25 of the contact material column therebelow. Liquid or mixed phase hydrocarbon charge from spray device 41 and/or 43 is sprayed into that central portion of the gas space 27 within which said shower of particles is maintained so that the liquid hydrocarbon charge is uniformly deposited upon the showering contact material particles and prevented from reaching the hot metal surfaces adjacent the outer periphery of space 27. The contact material particles from the shower soon uniformly distribute themselves across the entire column cross-sectional area so as to provide uniform contacting of the liquid hydrocarbons with all the contact material. If desired, in operations wherein the charge stock is partially vaporizable at the desired conversion temperature, the charge may be subjected to a preliminary fractionation to separate the heavy liquid portion of the charge from the vaporizable portion. Then the liquid may be introduced in heated condition through nozzles 41 and/or 43 and the heated hydrocarbon vapor charge may be separately introduced to the converter through conduit 80. The contact material and liquid hydrocarbons pass downwardly through the conversion zone and the liquid hydrocarbons are converted to gaseous hydrocarbon products. It will be understood that the term "gaseous" as used herein in describing and in claiming this invention is used in a broad sense as meaning material in the gaseous phase under existing operating conditions regardless of the normal phase of that material under ordinary atmospheric conditions. Gaseous conversion products are separately withdrawn from the lower section of the conversion zone through collector troughs 48 and 49 and pipes 51 and 52, and 51' and 52', respectively. The flow in the pipes 51, 52, 51' and 52' is throttled so as to provide the proper flow of products from each row of collector troughs. Used contact material flows downwardly through the partition arrangement 57, 58 and 59 in the lower end of vessel 17 and is withdrawn through outlet conduit 60 at a rate controlled by valve 61. The partition arrangement 57, 58 and 59 is such as will insure uniform withdrawal of contact material from all portions of the chamber cross-sectional area in the conversion zone thereabove. It will be noted that the rate of contact material withdrawal through conduit 60 is equal to the sum of the rate of contact material introduction through conduit 26 and through conduits 24. Usually, it is preferable to introduce the major portion of the contact material charge through the central conduit 26 so that most of the contact material charged may be immediately contacted with the liquid phase hydrocarbons sprayed into the gas space 27 as said contact material showers downwardly through the central core of said gas space. In such an operation, it is important to maintain the level of the surface of the column of contact material substantially constant within the conversion zone. This is automatically accomplished in the operation described hereinabove since the contact material flow in pipes 24 is automatically throttled only by the column surface level. Thus, only as much contact material passes through conduits 24 as is required to maintain the column surface level substantially at 25 as shown. In order to prevent escape of hydrocarbon vapors from the conversion zone into seal chamber 22 an inert seal gas such as steam or flue gas may be introduced through conduit 46 into the seal chamber 22 at a rate so controlled by diaphragm operated valve 64 and differential pressure controller 65 as to maintain an inert gaseous atmosphere in zone 22 at a pressure slightly higher (for example ¼-½ lb. per sq. in.) than the pressure in gas space 27. An inert purge gas such as steam or flue gas may be introduced through conduit 67 below partition 54 to strip hydrocarbons from the outflowing contact material. Spent or used contact material passes via conduit 60 into conveyor 19 by which it is conducted to vessel 10. If the contact material is an adsorbent catalyst, air or other oxygen containing gas is introduced at 11 into vessel 10 to burn the carbonaceous contaminant from the contact material. Flue gas may be withdrawn at 13. A suitable heat exchange fluid introduced at conduit 12 and withdrawn at conduit 14 may be passed through tubes within vessel 10 which communicate with conduits 12 and 14 under conditions suitable to control the regenerating catalyst temperature below a heat damaging level. For clay type adsorbents the heat damaging level is of the order of 1200° F. while for gel-type catalysts it may be somewhat higher. Regenerated contact material flows via conduit 16 to conveyor 20 by which it is returned to reactor supply hopper 18.

It should be understood that the invention is not considered to be limited to the specific apparatus construction described hereinabove. Reaction vessels having cross-sectional shapes other than circular as shown may be employed. In such cases the shape of skirt 38 and baffle 39 should be modified accordingly. Moreover, the other baffle systems than the skirt and cone system described hereinabove are contemplated as long as they are adapted to provide a shower of freely falling contact material particles through a central portion of the gas space 27. For example, instead of a single pipe 26, several smaller pipes of similar length may be employed. Such pipes would all be positioned and uniformly spaced in that central portion of the area of partition 21 which is included within the projected area of the skirt 38. Separate flow control devices connected to a single adjustment shaft may be provided below such pipes, and several smaller baffles may be employed to replace baffle 39. Also several inlet jets may be spaced uniformly at a given single level within the lower section of curtain 38 to replace the single jet 41. In vessels of very large horizontal cross-sectional area, it may be desirable to provide several uniformly spaced shower units within a central portion of the vessel cross-sectional area instead of the single unit shown in Figure 1. Each shower unit would comprise a pipe 29, flow control device 28, baffle 39, curtain 38 and jet 41 so as to provide a plurality of contact material and liquid oil showers within a central portion of the horizontal area of a single vessel of large diameter. Also, other means for throttling the solid flow from conduit 26 may be substituted for the one described hereinabove. Moreover, other suitable apparatus adapted for separate withdrawal of gaseous conversion products and other suitable apparatus adapted to control uniform withdrawal of solid material from all sections of the vessel cross-sectional area may be substituted for the apparatus specifically shown in Figure 1.

Figure 3:
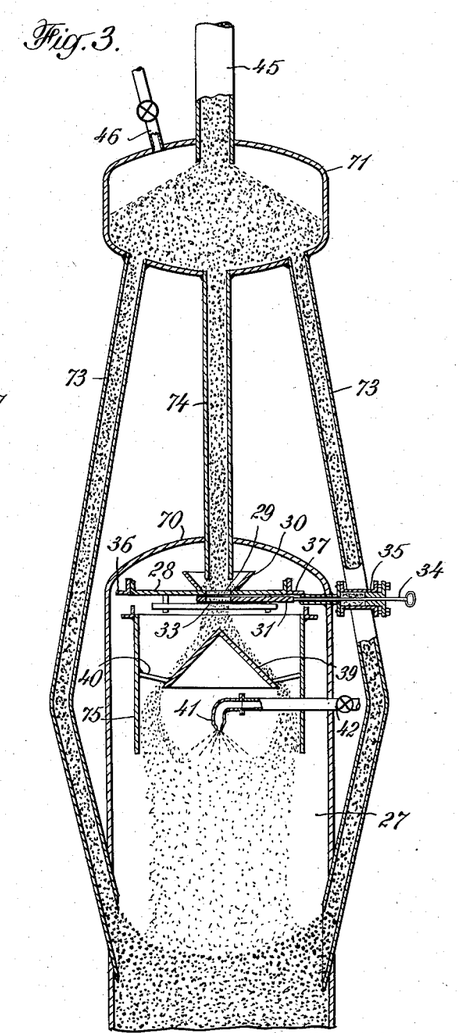
Figure 3 is an elevational view, in section, showing a modified form of the invention. All of these drawings are highly diagrammatic in form.

A somewhat modified form of the invention may be seen in Figure 3 wherein there is shown only the upper section of a conversion vessel 70 having a seal chamber 71 positioned thereabove. It will be understood that provision for gaseous product and used contact material withdrawal from vessel 70 may be provided in its lower section (not shown) substantially as is shown for vessel 17 in Figure 1. The seal chamber 71 is separated from the conversion vessel and conduits 73 are provided for contact material flow from chamber 71 to the surface of the column of contact material in chamber 70. It will be noted that the conduits 73 do not pass through the gas space 27 within the upper section of vessel 70 at all but enter vessel 70 only at a plurality of points around its periphery substantially at the level at which it is desired to maintain the surface of the contact material column. By this construction, any chance for liquid hydrocarbon charge to contact the hot metal surface of the contact material feed pipes before the column of contact material is reached is eliminated. Contact material may also be supplied to the central portion of the converter cross-sectional area through conduit 74. The throttle device and conical baffle below the lower end of conduit 74 are substantially the same as those same devices shown in Figure 1. The skirt 75 differs from the skirt 38 of Figure 1 in that it is not tapered inwardly, a feature which is not in all cases necessary.

While the provision for contact material introduction directly onto the surface of the contact material column through conduits which extend through only the outer edge of the gas space above the column in the conversion zone or through conduits which do not extend through said gas space at all as shown in Figure 3 in itself serves to substantially limit the formation of large particles of coke in the system, this invention in its preferred form contemplates also the provision of the shower of contact material charge in the central portion of the gas space above the contact material column into which central portion the liquid hydrocarbon charge is sprayed.

The exact dimensions of the several elements which make up the improved apparatus combination described hereinabove will, of course, be dependent to a certain extent upon the particular operation and operating conditions for which the apparatus is to be employed. In general, it has been found desirable to provide a vertical distance of the order of 5 to 15 feet between the contact material baffling such as baffles 38 and 39 of Figure 1 and the level at which the contact material column is to be maintained in the conversion chamber. The relative dimensions of the skirt 38 and baffle 39 and the vessel 17 will, of course, vary with the dimensions of the vessel 17 and the desired rate of contact material flow.

As an example of a satisfactory construction, in a catalytic cracking reactor having a diameter of about 16 feet about 24 feed pipes such as pipes 24 in Figure 1 having a diameter of about 3½ inches were spaced at intervals around the periphery of the upper section of the reactor vessel. The central feed pipe 26 was about 10 inches in diameter, the conical baffle 39 measured about 42 inches in height and 6 feet, 11 inches in diameter at its base A cylindrical skirt baffle of the type shown in Figure 3 and having an internal diameter of about 7 feet, 3 inches was provided. The skirt baffle extended about one foot below the base of the conical baffle. A vertical space of about 10 feet was provided between the lower edge of skirt 38 and the lower ends of pipe 24. In this apparatus, the total rate of contact material flow was of the order of 100 tons per hour of which about seventy-five to eighty percent entered through the central conduit 26. In the above apparatus, the rate of fluid hydrocarbon charge was of the order of 1500 to 3000 barrels (42's) per day. In the apparatus of the above example the catalyst falls from the annular passage between the skirt baffle and the conical baffle as a tubular curtain of extending down to the bed surface.

The conditions of operation in the apparatus of this invention will vary widely depending upon the particular operational application involved. In general, the contact material should be supplied at a temperature suitable to support the conversion desired. This temperature will vary somewhat depending upon the particular contact material to oil ratio chosen. In catalytic cracking operations on clay-type catalysts, the contact material charge to oil charge ratio may vary from about 1.0 to 20 parts by weight of contact material per part of oil. The oil space velocity may be within the range of about 0.3 to 10.0 volumes of oil (measured at 60° F.) per hour per volume of contact material column within the conversion zone. The contact material in the case of catalytic cracking operations may enter the conversion chamber at temperatures of the order of 800° F. to 1200° F., and may undergo a temperature drop of the order of 15° F. to 300° F. in passing through the conversion zone. In the case of thermal cracking operations over inert contact materials, the contact material temperature may be much higher.

In general, it has been found that for preferable operation the amount of contact material entering through conduits 24 (Figure 1) should be of the order of about 20 to 50 percent of the total contact material passed through the converter, the remainder of the contact material being supplied through conduit 26 (Figure 1). In such a process, it has been found desirable to control the contact material particle size broadly within the range 3 to 100 mesh and preferably within the range about 4 to 20 mesh by Tyler standard screen analysis. The percentage of fines present in the contact material mass should be maintained as low as possible.

The invention may be employed for conversion of hydrocarbon charge stocks which are partially vaporizable under the conversion conditions or it may be employed for the conversion of reduced crudes and the like which consist for the most part of hydrocarbons boiling above the desired average conversion temperature. It is usually preferable to heat the hydrocarbon charge to a temperature of the order of 600° F. to 900° F. before introducing it into the conversion chamber.

It should be understood that the particular details of apparatus construction and the examples of operating conditions and process applications of the invention given hereinabove are intended as illustrative and are in no way to be construed as limiting the scope of this invention except as it may be limited by the following claims.

We claim:

1. The method for converting high boiling liquid and mixed phase hydrocarbons to lower boiling gaseous hydrocarbons which comprises maintaining a substantially compact column of particle-form contact material throughout a portion of the length of a confined substantially vertical conversion zone so as to provide a gas space within the upper portion of said zone, maintaining a confined accumulation of particle-form contact material above said conversion zone, supplying contact material at a suitable elevated conversion supporting temperature to said confined accumulation, passing a plurality of confined streams of said contact material through a plurality of confined passages extending downwardly from said accumulation through said gas space in said conversion zone to the surface of said column of contact material in said conversion zone, said confined streams extending downwardly through said gas space only along a plurality of uniformly spaced lines near the periphery of said conversion zone, withdrawing contact material from the lower portion of said conversion zone at a controlled rate, introducing a spray of a high boiling hydrocarbon charge at least partially in the liquid phase into said gas space in the upper portion of said conversion zone at a location positioned substantially centrally of the horizontal cross-sectional area of said gas space, introducing at least one separate stream of said contact material at a controlled rate from said accumulation into the upper section of said gas space substantially centrally of its horizontal cross-sectional area, passing contact material from said stream downwardly through a central portion of said gas space as a dispersed, freely falling shower of particles, so as to contact said liquid hydrocarbon spray in said gas space before falling onto the surface of said column, passing the hydrocarbon charge through said conversion zone concurrently with the contact material flow in said column withdrawing gaseous conversion products from said column within the lower section of said conversion zone, and maintaining an inert gaseous blanket within said confined accumulation above said conversion zone to prevent flow of hydrocarbons thereinto.

2. The method for conversion of high boiling liquid and mixed phase hydrocarbons in the presence of a moving particle-form solid contact material which method comprises substantially continuously introducing particle-form contact material at a suitable conversion supporting temperature into a confined, elongated conversion zone at a location near the outer periphery of said zone and substantially below the upper end of said zone, passing said contact material as a substantially compact column downwardly through said zone, withdrawing particle-form contact material from the lower portion of said zone at a controlled rate so as to maintain the surface of said column within said zone at the level of said location of introduction below the upper end of said zone, introducing high boiling liquid hydrocarbons into said conversion zone as a liquid spray emanating from a location in the central portion of the horizontal cross-sectional area of said zone and at a level substantially above the surface of said column, introducing a separate stream of contact material into said conversion zone at a central location positioned above the level of said liquid hydrocarbon introduction, causing the contact material from said stream to shower downwardly through a central portion of said zone onto the surface of said column so that it may be contacted with said liquid hydrocarbon spray before reaching the surface of said column, passing said hydrocarbons downwardly within said column to effect conversion of said liquid hydrocarbons to lower boiling gaseous hydrocarbons and withdrawing gaseous hydrocarbons from the lower portion of said column.

3. The method for the cracking conversion of high boiling liquid hydrocarbons in the presence of a moving particle-form catalyst which comprises: maintaining a substantially compact column of particle-form catalyst throughout a lower portion of an elongated, substantially vertical, confined conversion zone, maintaining a confined accumulation of said catalyst above said conversion zone at a temperature suitable for supporting the hydrocarbon conversion in said conversion zone, supplying freshly regenerated catalyst to said accumulation, passing contact material downwardly from said accumulation in a plurality of confined compact streams extending downwardly through the upper portion of said conversion zone and down to the surface of said column within said conversion zone, said confined streams extending downwardly through only that portion of the cross-sectional area of the upper portion of said conversion zone which is close to the outer periphery of said conversion zone, introducing a separate stream of catalyst from said accumulation into the upper portion of said conversion zone at a level substantially above the surface of said column of catalyst, throttling the flow of said last named stream of catalyst, baffling the flow of catalyst from said last named stream so as to cause said catalyst to fall through a central portion of the upper section of said zone onto the surface of said column as a shower of dispersed freely falling particles, withdrawing spent catalyst from the lower section of said conversion zone at a controlled rate, spraying a heated high boiling liquid hydrocarbon charge into the upper section of said conversion zone at a central location and at a level substantially above the surface of said column so that said liquid hydrocarbon charge is substantially uniformly contacted with said catalyst raining downwardly through the upper portion of said conversion zone before it reaches the surface of said column, withdrawing gaseous hydrocarbon products from the lower section of said conversion zone, and maintaining a substantially inert gaseous pressure in said accumulation to prevent escape of gaseous hydrocarbons from said conversion zone thereinto.

4. The method for conversion of high boiling liquid hydrocarbons to lower boiling gaseous hydrocarbons in the presence of a moving particle-form contact material which comprises: introducing heated high boiling liquid hydrocarbons downwardly into the upper section of a confined conversion zone as a finely divided spray, introducing particle-form contact material into the upper section of said zone at a suitable temperature for said hydrocarbon conversion and causing said contact material to shower as freely falling dispersed particles downwardly through an upper portion of said conversion zone onto a column of said contact material in said conversion zone therebelow in such a manner as to contact said spray of liquid hydrocarbons before reaching said column, passing said hydrocarbons downwardly within said column to effect conversion to lower boiling gaseous hydrocarbon products, withdrawing gaseous hydrocarbon products from the lower section of said conversion zone, withdrawing used particle-form contact material from the lower portion of said conversion zone at a controlled rate, and supplying contact material at a suitable temperature for said hydrocarbon conversion through at least one separate confined passage substantially directly onto the surface of said column of contact material in said conversion zone at a rate sufficient to maintain substantially constant the level of the surface of said column.

5. The method of claim 4 characterized in that the rate of contact material supply to said conversion zone through said confined stream directly onto the surface of said column is within the range 20 to 50 percent of the total rate of contact material introduction to said conversion zone.

6. The method for converting high boiling liquid and mixed phase hydrocarbons to lower boiling gaseous hydrocarbons which comprises: maintaining a substantially compact column of particle-form contact material throughout a lower portion of a confined, enlongated conversion zone, causing said contact material in said column to move downwardly by withdrawing used contact material at a controlled rate from the lower section of said conversion zone, replenishing said column by directing contact material at a suitable conversion supporting temperature as at least one substantially confined stream directly onto the surface of said column and by separately introducing contact material into the upper portion of said conversion zone a substantial distance above the surface of said column and causing said last named contact material to pass as a rain of freely falling particles downwardly through the upper portion of said conversion zone onto the surface of said column, spraying a heated high boiling fluid hydrocarbon charge into the upper portion of said conversion zone to contact said rain of contact material particles as it falls towards the surface of said column and withdrawing gaseous hydrocarbon conversion products from the lower portion of said conversion zone.

7. An apparatus for conducting the conversion of high boiling liquid hydrocarbons to lower boiling hydrocarbons in the presence of a moving particle-form contact material which apparatus comprises: means defining an elongated conversion chamber adapted for confining a compact column of particle-form contact material, a confined seal chamber above said conversion chamber, means to supply contact material into said seal chamber, conduit means for flow of contact material extending downwardly from said seal chamber into said conversion chamber and terminating at a location substantially in the central portion of its horizontal cross-sectional area and shortly below its upper end, adjustable flow throttling means adjacent the lower end of said conduit means, baffling below the lower end of said conduit means within said conversion chamber adapted to distribute the flow of contact material as a shower of dispersed particles falling downwardly through a central portion of the upper section of said conversion chamber, spray means positioned below said baffling and substantially centrally of the chamber horizontal cross-sectional area, means to supply liquid hydrocarbon charge to said spray means, a plurality of spaced conduits for solid flow extending downwardly from said seal chamber to a plurality of points spaced within and near the periphery of said conversion chamber a substantial distance below said spray means, means to withdraw contact material from the lower portion of said conversion chamber and flow throttle means associated therewith to permit control of the rate of contact material flow, such as to maintain a column of contact material within said conversion chamber, means to substantially separately withdraw gaseous material from the lower section of said conversion chamber and means to introduce an inert seal gas into said seal zone.

8. In a system of the type described for hydrocarbon conversion the apparatus which comprises in combination: a substantially vertical conversion vessel, a partition across said vessel in its upper section defining a seal chamber in the upper end of said vessel, conduit means to admit a seal gas into said seal chamber, means to introduce particle-form contact material in said seal chamber, a plurality of spaced conduits extending downwardly from said partition close to the vessel wall and terminating at a level substantially below said partition, at least one conduit dependent from said partition extending downwardly in the central portion of the vessel horizontal cross-sectional area and terminating substantially above the lower ends of said first named conduits, flow throttle means adjacent the lower end of said last named conduit adapted for adjustment from a point outside said vessel, baffling below said flow throttle means adapted to shower contact material from said last named conduit downwardly through only a central portion of the chamber cross-sectional area, at least one substantially centrally positioned liquid spray device below said baffle means to introduce liquid oil charge into said spray device, conduit means for solid withdrawal from the lower end of said vessel, flow throttling means associated with said last named conduit means, gas collecting members within the lower section of said vessel and means to withdraw gaseous material from said collecting members.

9. In a system of the type described for hydrocarbon conversion the apparatus which comprises in combination: a substantially vertical conversion vessel, a partition across said vessel in its upper section defining a seal chamber in the upper end of said vessel, conduit means to admit a seal gas into said seal chamber, means to introduce particle-form contact material in said seal chamber, a plurality of spaced conduits extending downwardly from said partition close to the vessel wall and terminating at a level substantially below said partition, at least one conduit dependent from said partition extending downwardly in the central portion of the vessel horizontal cross-sectional area and terminating substantially above the lower ends of said first named conduits, flow throttle means adjacent the lower end of said last named conduit adapted for adjustment from a point outside said vessel, a conical baffle centrally positioned below said last named conduit, means defining a vertically extending curtain around said baffle, said curtain enclosing a vertical space in said chamber of substantially less horizontal dimensions than said chamber but of greater horizontal dimensions than the base of said baffle so as to provide a space for solid flow between said baffle and said curtain, at least one liquid spray device positioned substantially centrally of the horizontal cross-sectional area of said chamber and adjacent the lower end of said curtain, means to introduce liquid oil charge into said spray device, conduit means for solid withdrawal from the lower end of said vessel, flow throttling means associated with said last named conduit means, gas collecting members within the lower section of said vessel and means to withdraw gaseous material from said collecting members.

10. The method for conversion of high boiling liquid hydrocarbons to lower boiling gaseous hydrocarbons in the presence of a moving particle-form contact material which comprises: introducing heated high boiling liquid hydrocarbons downwardly into the upper section of a confined conversion zone as a finely divided spray, introducing particle-form contact material into the upper section of said zone at a suitable temperature for said hydrocarbon conversion and causing said contact material to shower as freely falling dispersed particles downwardly through an upper portion of said conversion zone onto a column of said contact material in said conversion zone therebelow in such a manner as to contact said spray of liquid hydrocarbons before reaching said column, passing said hydrocarbons downwardly within said column to effect conversion to lower boiling gaseous hydrocarbon products, introducing a vaporized hydrocarbon charge into the upper section of said conversion zone above said column of contact material, passing said vaporized charge downwardly through said column to effect its conversion to lower boiling gaseous hydrocarbon products, withdrawing the mixed gaseous hydrocarbon products from the lower section of said conversion zone, withdrawing used particle-form contact material from the lower portion of said conversion zone at a controlled rate, and supplying contact material at a suitable temperature for saaid hydrocarbon conversion through at least one separate confined passage substantially directly onto the surface of said column of contact material in said conversion zone at a rate sufficient to maintain substantially constant the level of the surface of said column.

11. In a system of the type described for hydrocarbon conversion the apparatus which comprises in combination: a substantially vertical conversion vessel, a partition across said vessel in its upper section defining a seal chamber in the upper end of said vessel, conduit means to admit a seal gas into said seal chamber, means to introduce particle-form contact material in said seal chamber, a plurality of spaced conduits extending downwardly from said partition close to the vessel wall and terminating at a level substantially below said partition, at least one conduit dependent from said partition extending downwardly in the central portion of the vessel horizontal cross-sectional area and terminating substantially above the lower ends of said first named conduits, flow throttle means adjacent the lower end of said last named conduit adapted for adjustment from a point outside said vessel, baffling below said flow throttle means adapted to shower contact material from said last named conduit downwardly through only a central portion of the chamber cross-sectional area, at least one substantially centrally positioned liquid spray device below said baffle means to introduce liquid oil charge into said spray device, conduit means for introduction of vaporized charge to said vessel at a level above the lower ends of said first named conduits, conduit means for solid withdrawal from the lower end of said vessel, flow throttling means associated with said last named conduit means, gas collecting members within the lower section of said vessel and means to withdraw gaseous material from said collecting members.

12. An apparatus for conducting the conversion of high boiling liquid hydrocarbons in the presence of a moving contact material which comprises: an elongated conversion chamber adapted to confine a column of particle-form contact material, a plurality of solid feed conduits terminating on their lower ends at a plurality of points within said chamber spaced around and near its horizontal periphery and located in the upper section of said chamber but substantially below its upper end, means to withdraw contact material from the lower section of said chamber, a liquid spray device positioned within the upper section of said vessel above the level of the lower ends of said solid feed conduits, said spray device being positioned substantially centrally of the chamber cross-sectional area, at least one separate feed conduit for solid material extending into the upper section of said chamber and terminating at a location above said spray device and substantially centrally of the chamber cross-sectional area, means to supply liquid oil charge to said spray device, and means to separately withdraw gaseous hydrocarbons from the lower section of said chamber.

13. An apparatus for conducting the conversion of high boiling liquid hydrocarbons in the presence of a moving contact material which comprises: an elongated conversion chamber adapted to confine a column of particle-form contact material, a plurality of solid feed conduits terminating on their lower ends at a plurality of points within said chamber spaced around and near its horizontal periphery and located in the upper section of said chamber but substantially below its upper end, means to withdraw contact material from the lower section of said chamber, a liquid spray device positioned within the upper section of said vessel above the level of the lower ends of said solid feed conduits, said spray device being positioned substantially centrally of the chamber cross-sectional area, means to supply liquid oil charge to said spray device, a separate solid material feed conduit connecting into the top of said chamber and terminating on its lower end above said spray device, baffles below said last named conduit adapted to form the solid flow therefrom into a curtain of freely falling particles which is confined to a central portion of the upper section of said chamber, and means to separately withdraw gaseous hydrocarbons from the lower section of said chamber.

14. In a process for converting hydrocarbons involving the utilization of a bed of contact material which gravitates through a conversion zone the steps which comprise, maintaining a space free of said bed in an upper portion of said zone, said space having metal surfaces adjacent its outer periphery, delivering contact material in a downwardly flowing, solid stream of discrete particles to a location in said space disposed centrally of its cross section and a substantial distance above the surface of said bed, causing the contact material so delivered to gravitate through said space toward the upper surface of said bed, radially deflecting the particle flow in said solid stream at a level within the upper portion of said space to form a freely falling tubular curtain of contact material, said curtain occupying an area corresponding to only a central portion of the horizontal cross section of said space above said bed, supplying a liquid hydrocarbon material to at least one location interiorly of and concentrically with respect to said tubular curtain and spraying said liquid material toward and into a circumferentially complete area of said tubular curtain at a location spaced a substantial distance above the surface of said bed to effect contact of said liquid material with the freely falling contact material particles before they reach the bed surface, whereby the liquid material is prevented from reaching the metal surfaces adjacent the outer periphery of said space.

15. A process for conversion of high boiling liquid hydrocarbons to lower boiling gasoline containing products which comprises, maintaining a substantially compact bed of particle-form contact material in a lower portion of a confined contacting zone and maintaining a column free space in said zone above the surface of said bed, withdrawing contact material from the lower end of said bed to promote downward movement of particles in said bed, introducing a particle-form contact material into the upper portion of said space and causing it to form a shower of particles falling freely to the surface of said bed, which shower is restricted to a circular area consisting only a portion of the horizontal cross-section of said space and spaced substantially away from the walls confining said space, spraying a high boiling liquid hydrocarbon charge downwardly towards said bed from a location situated in said space above the surface level of said bed and centrally of the area occupied by said shower, the liquid charge being substantially all restricted throughout said space above the surface of said bed to the circular area of said space defined by said shower, causing the hydrocarbon charge to flow downwardly within said bed to complete the conversion to lower boiling products and withdrawing said products from said contacting zone.

16. A process for conversion of high boiling liquid hydrocarbons to lower boiling gasoline containing products which comprises, maintaining a substantially compact bed of particle-form contact material in a lower portion of a vertical housing and maintaining the surface of said bed at a level spaced substantially below the upper end of said housing so as to provide a space free of said column within an upper portion of said housing above the bed surface, introducing a spray of high boiling liquid hydrocarbon reactant into said space at at least one point located above the surface of said bed and spaced away from the surrounding housing walls, introducing a particle-form contact material having conversion temperature into said space above the point of liquid feed introduction and causing it to form a shower of particles falling freely to the surface of said column, which shower is restricted to an area constituting only a portion of the horizontal cross section of said space and spaced away from the surrounding housing walls, said shower laterally surrounding said point of liquid introduction on all sides and being adapted to insure contact between the liquid feed and the contact material particles before said particles reach the surface of said column, thereby preventing the liquid feed from reaching the metal walls of said housing which surround said space above said column, flowing the hydrocarbon reactant downwardly through a substantial portion of said bed to complete the desired conversion to lower boiling products existing in the vapor phase and withdrawing said products from the bed at a level below its surface.

17. A process for conversion of high boiling liquid hydrocarbons to lower boiling gasoline containing products which comprises, maintaining a substantially compact bed of particle-form contact material in a lower portion of a vertical housing and maintaining the surface of said bed at a level spaced substantially below the upper end of said housing so as to provide a space free of said column within an upper portion of said housing above the bed surface, introducing a plurality of streams of contact material at a suitable temperature for said conversion into the upper portion of said space and causing the particles from said streams to gravitate downwardly through said space onto the surface as a plurality of uniformly spaced restricted showers of generally circular cross sectional shape, each of said showers being spaced entirely a substantial distance away from the surrounding housing walls, supplying a stream of liquid hydrocarbon reactant to a central point within each of said showers a substantial distance above the surface of said bed and spraying the liquid reactant onto the falling particles to contact the same, whereby the feed introduced within each shower is substantially retained within the portion of the space cross-section occupied by that shower, passing the reactant downwardly within said bed to complete its conversion to a lower boiling gasiform product and withdrawing said product from said bed substantially below its surface.

18. An apparatus for conducting the conversion of high boiling liquid hydrocarbons in the presence of a moving contact material which comprises: an elongated conversion chamber adapted to confine a column of particle-form contact material, a plurality of solid feed conduits terminating on their lower ends at a plurality of points within said chamber spaced around and near its horizontal periphery and located in the upper section of said chamber but substantially below its upper end, means to withdraw contact material from the lower section of said chamber, a downwardly facing liquid spray device positioned centrally within the upper section of said vessel above the level of the lower ends of said solid feed conduits, said spray device being positioned substantially centrally of the chamber cross-sectional area, means to supply liquid oil charge to said spray device, members defining a downwardly opening annular shaped passageway positioned in the central portion of said chamber above said spray device, said passageway being of substantially smaller diameter than said chamber but of greater lateral dimension than said spray device and sharing a common vertical axis therewith, means to supply contact material from a location above said chamber downwardly into said annular passageway, and means to separately withdraw gaseous hydrocarbons from the lower section of said chamber.

19. In an apparatus for conducting conversion of liquid hydrocarbons in the presence of a moving contact material, an elongated conversion chamber adapted to confine a column of particle-form contact material, means to withdraw contact material from the lower end of said chamber, means to control a constant bed surface level in said chamber a substantial distance below its upper end, members defining a downwardly opening annular passage positioned centrally in the upper section of said chamber, said passage being of restricted cross sectional area amounting to only a minor fraction of the cross sectional area of said chamber and having substantially smaller lateral dimensions than said chamber so as to be spaced a substantial distance away from the walls of said chamber, members defining a confined supply passage arranged for delivering contact material from above to said annular passage, a liquid spray device positioned centrally below said annular passage within the upper section of said chamber, means to supply liquid oil charge to said spray device and means to withdraw reactant vapors from said chamber.

20. A process for converting high boiling liquid hydrocarbons to lower boiling product comprising, introducing a stream of particle form contact material in heated condition into the upper section of a confined conversion zone and causing it to form a shower of particles falling freely through an upper portion of said conversion zone onto a column of said contact material therebelow in said zone, which shower is restricted to a circular area amounting to only a portion of the horizontal cross-sectional area of said zone and spaced substantially away from the walls confining said zone, spraying a high boiling liquid hydrocarbon charge downwardly towards said column from a location above said bed and centrally of the area occupied by the shower, the liquid hydrocarbons before reaching said bed being restricted to the portion of the zone cross section which is defined by the boundaries of said shower of contact material, flowing contact material and hydrocarbons downwardly within said column to complete the conversion to lower boiling products existing in the gaseous phase, withdrawing the gasiform products from said zone, withdrawing used contact material from the lower portion of said conversion zone at a controlled rate, and supplying contact material at a suitable temperature for said hydrocarbon conversion through at least one separate confined passage substantially directly onto the surface of said column of contact material in said conversion zone at a rate sufficient to maintain substantially constant the level of the surface of said column.

21. A process for converting high boiling liquid hydrocarbons to lower boiling gasiform products comprising, maintaining a substantially compact bed of particle form contact material in a lower portion of a conversion zone, withdrawing contact material from the lower section of said conversion zone, replenishing said bed with contact material at least in part as set forth hereinafter and controlling the relationship between the total rates of contact material supply and withdrawal to maintain a substantially constant bed surface level below the upper end of said conversion zone, whereby a bed-free space is provided in an upper portion of said conversion zone above the bed surface, introducing a stream of particle-form contact material having conversion temperature into said bed-free space above the surface of said bed and causing said stream to flow downwardly through a restricted annular passage located a substantial distance above said bed surface and centrally with respect the space cross-section and having a horizontal cross-sectional area substantially below that of said gas space, causing the contact material to drop downwardly from all around said annular passage as particles falling freely through only a central portion of the bed-free space, spaced substantially inwardly from the surrounding housing walls onto the surface of said bed, introducing liquid hydrocarbon feed into said bed-free space centrally below said annular passage and a substantial distance above said bed surface, spraying the liquid downwardly towards said bed, the liquid feed being substantially all restricted before reaching said bed to the central portion of said bed-free space surrounded by the falling particles, flowing the contact material and hydrocarbons downwardly within said bed to complete the conversion and withdrawing gasiform hydrocarbons from the lower section of said bed.

22. In a process wherein high boiling liquid hydrocarbons are brought into contact with a substantially compact bed of particle-form solid material in a vertical housing to effect conversion to lower boiling products, the method for supplying liquid hydrocarbon feed to said bed which comprises, introducing a stream of contact material having conversion temperature into the upper section of said housing and causing said stream to flow downwardly through a restricted annular passage located centrally with respect the housing cross-section and having a horizontal cross-sectional area substantially less than that of said housing, causing the contact material to drop downwardly from all around said annular passage as a shower of freely falling particles through only a central portion of the housing cross-section, spaced substantially inwardly from the surrounding housing walls onto the surface of a substantially compact bed of said contact material maintained in a lower portion of said housing, introducing liquid hydrocarbon feed into said housing at a location disposed concentrically within said shower and spaced substantially above the surface of said bed and spraying the liquid feed downwardly and diagonally toward the periphery of said shower in such a manner that it is substantially retained within the central portion of said housing occupied by said shower.

23. A process for converting high boiling liquid hydrocarbons to lower boiling gasiform products comprising, maintaining a substantially compact bed of particle-form contact material in a lower portion of a conversion zone, withdrawing contact material from the lower section of said conversion zone, replenishing said bed with contact material at least in part as set forth hereinafter and controlling the relationship between the total rates of contact material supply and withdrawal to maintain a substantially constant bed surface level below the upper end of said conversion zone, whereby a bed-free gas space is provided in an upper portion of said conversion zone above the bed surface, introducing a downward spray of at least partially liquid hydrocarbon charge into said space from at least one point substantially above the surface of said bed and centrally of the horizontal cross section of said space, restricting said spray substantially entirely throughout said space above the surface of said bed to a central portion of said space substantially spaced away from the walls laterally confining said space, introducing at least a portion of the particle-form contact material supply for said conversion zone into the upper section of said space above the point of liquid introduction and causing it to form a shower of particles falling freely through only a central portion of said space cross-section spaced away from said walls, said shower being concentrically arranged with respect to the point of liquid introduction and inclosing the area of said spray on its outer periphery whereby atomized liquid tending to escape from said area is contacted with the falling particles and prevented from reaching said surrounding walls, flowing the hydrocarbon feed downwardly within said bed to complete its conversion to lower boiling products and withdrawing said products from the lower section of said bed.

24. In a process for converting high boiling liquid hydrocarbons at elevated temperatures in contact with a bed of contact material moving downwardly through a confined conversion zone, the improved method for supplying a high boiling liquid hydrocarbon feed to said bed without serious coking of the confining walls and with uniform distribution of liquid on the contact material which method comprises, introducing a stream of heated contact material into the upper section of said conversion zone and causing said stream to flow downwardly through a restricted annular passage located centrally with respect the walls of the housing which laterally confine said zone, and being spaced substantially inwardly from said walls, causing the contact material to drop downwardly from all around said annular passage as a curtain of freely falling particles through only a central portion of the zone cross-section onto the surface of the bed of said contact material maintained in a lower portion of said conversion zone, said curtain having its outer periphery spaced a substantial distance inwardly from the walls confining said conversion zone, introducing a liquid hydrocarbon feed into said zone at a location concentrically within the curtain and spaced above the surface of said bed and spraying the liquid downwardly in an area of said zone which is restricted to the central area within the periphery of said curtain to effect at least a partial contact between the liquid and contact material before the bed surface is reached.

25. A process according to claim 23 further characterized in the steps of introducing a vaporized hydrocarbon feed into said conversion zone above the level of said shower and flowing the vaporized hydrocarbon feed downwardly to and within said bed to effect conversion thereof along with said liquid feed.

26. The method of claim 20 further characterized by the fact that said shower is controlled in the form of a tubular curtain.

ERNEST UTTERBACK.
FRANK C. FAHNESTOCK.

REFERENCES CITED

The following references are of record in the file of this patent:

UNITED STATES PATENTS

| Number | Name | Date |
|---|---|---|
| 1,450,327 | Meischke-Smith | Apr. 3, 1923 |
| 1,516,934 | Thornhill | Nov. 25, 1924 |
| 2,240,347 | Page, Jr., et al. | Apr. 29, 1941 |
| 2,394,651 | Alther | Feb. 12, 1946 |
| 2,416,230 | Simpson | Feb. 18, 1947 |
| 2,432,344 | Sinclair | Dec. 9, 1947 |
| 2,439,372 | Simpson | Apr. 6, 1948 |
| 2,458,162 | Hagerbaumer | Jan. 4, 1949 |

OTHER REFERENCES

Noll et al.: "Houdry Pioneer" (page 1), October 1946.